(12) United States Patent
Logan

(10) Patent No.: US 8,867,919 B2
(45) Date of Patent: Oct. 21, 2014

(54) MULTI-PORT ACCUMULATOR FOR RADIO-OVER-FIBER (ROF) WIRELESS PICOCELLULAR SYSTEMS

(75) Inventor: Eric Raymond Logan, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/360,204

(22) Filed: Jan. 27, 2012

(65) Prior Publication Data

US 2012/0121270 A1     May 17, 2012

Related U.S. Application Data

(63) Continuation of application No. 11/880,839, filed on Jul. 24, 2007, now abandoned.

(51) Int. Cl.
| | |
|---|---|
| *H04B 10/00* | (2013.01) |
| *H04B 10/80* | (2013.01) |
| *H04B 10/2575* | (2013.01) |
| *H04W 88/08* | (2009.01) |

(52) U.S. Cl.
CPC ........... *H04B 10/808* (2013.01); *H04W 88/085* (2013.01); *H04B 10/25754* (2013.01)
USPC ............ 398/116; 398/115; 398/117; 398/141

(58) Field of Classification Search
CPC ......................................... H04B 10/11–10/116
See application file for complete search history.

(56) References Cited

U.S. PATENT DOCUMENTS

| | | | |
|---|---|---|---|
| 4,365,865 | A | 12/1982 | Stiles |
| 4,449,246 | A | 5/1984 | Seiler et al. |
| 4,665,560 | A | 5/1987 | Lange |

(Continued)

FOREIGN PATENT DOCUMENTS

| | | | |
|---|---|---|---|
| AU | 645192 | B | 10/1992 |
| AU | 731180 | B2 | 3/1998 |

(Continued)

OTHER PUBLICATIONS

Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.

(Continued)

*Primary Examiner* — Li Liu
(74) *Attorney, Agent, or Firm* — C. Keith Montgomery

(57) ABSTRACT

A multi-port accumulator apparatus for a radio-over-fiber (RoF) wireless picocellular system comprising a housing supporting a tail cable port and transponder ports. The tail cable port is optically coupled to the RoF transponder ports to provide for transmission of uplink and downlink optical signals between the tail cable port and each of the transponder ports. The tail cable port is also electrically coupled to provide power to each transponder port. The multi-port accumulator supports RoF transponders, one at each of the transponder ports. Each RoF transponder includes a directional antenna system forming a picocellular coverage sub-area, with the combined sub-areas constituting a picocellular coverage area for the multi-port accumulator. The multi-port accumulator permits quick installation and deployment of large numbers of RoF transponders without individually connecting each RoF transponder to downlink and uplink optical fibers in an optical fiber RF communication link.

20 Claims, 10 Drawing Sheets

(56) References Cited

U.S. PATENT DOCUMENTS

| | | | |
|---|---|---|---|
| 4,867,527 A | 9/1989 | Dotti et al. | |
| 4,889,977 A | 12/1989 | Haydon | |
| 4,896,939 A | 1/1990 | O'Brien | |
| 4,916,460 A | 4/1990 | Powell | |
| 4,939,852 A | 7/1990 | Brenner | |
| 4,972,346 A | 11/1990 | Kawano et al. | |
| 5,039,195 A | 8/1991 | Jenkins et al. | |
| 5,042,086 A | 8/1991 | Cole et al. | |
| 5,056,109 A | 10/1991 | Gilhousen et al. | |
| 5,125,060 A | 6/1992 | Edmundson | |
| 5,187,803 A | 2/1993 | Sohner et al. | |
| 5,189,718 A | 2/1993 | Barrett et al. | |
| 5,189,719 A | 2/1993 | Coleman et al. | |
| 5,206,655 A | 4/1993 | Caille et al. | |
| 5,208,812 A | 5/1993 | Dudek et al. | |
| 5,210,812 A | 5/1993 | Nilsson et al. | |
| 5,260,957 A | 11/1993 | Hakimi | |
| 5,268,971 A | 12/1993 | Nilsson et al. | |
| 5,278,989 A | 1/1994 | Burke et al. | |
| 5,280,472 A | 1/1994 | Gilhousen et al. | |
| 5,301,056 A | 4/1994 | O'Neill | |
| 5,339,058 A | 8/1994 | Lique | |
| 5,339,184 A | 8/1994 | Tang | |
| 5,377,035 A | 12/1994 | Wang et al. | |
| 5,379,455 A | 1/1995 | Koschek | |
| 5,381,459 A | 1/1995 | Lappington | |
| 5,396,224 A | 3/1995 | Dukes et al. | |
| 5,400,391 A | 3/1995 | Emura et al. | |
| 5,420,863 A | 5/1995 | Taketsugu et al. | |
| 5,424,864 A | 6/1995 | Emura | |
| 5,444,564 A | 8/1995 | Newberg | |
| 5,457,557 A | 10/1995 | Zarem et al. | |
| 5,459,727 A | 10/1995 | Vanucci | |
| 5,469,523 A | 11/1995 | Blew et al. | |
| 5,519,830 A | 5/1996 | Opoczynski | |
| 5,539,393 A | 7/1996 | Barfod | |
| 5,543,000 A | 8/1996 | Lique | |
| 5,546,443 A | 8/1996 | Raith | |
| 5,557,698 A | 9/1996 | Gareis et al. | |
| 5,574,815 A | 11/1996 | Kneeland | |
| 5,598,288 A | 1/1997 | Collar | |
| 5,602,903 A | 2/1997 | LeBlanc et al. | |
| 5,606,725 A | 2/1997 | Hart | |
| 5,615,034 A | 3/1997 | Hori | |
| 5,627,879 A | 5/1997 | Russell et al. | |
| 5,640,678 A | 6/1997 | Ishikawa et al. | |
| 5,642,405 A | 6/1997 | Fischer et al. | |
| 5,644,622 A | 7/1997 | Russell et al. | |
| 5,648,961 A | 7/1997 | Ebihara | |
| 5,651,081 A | 7/1997 | Blew et al. | |
| 5,668,562 A | 9/1997 | Cutrer et al. | |
| 5,677,974 A | 10/1997 | Elms et al. | |
| 5,682,256 A | 10/1997 | Motley et al. | |
| 5,694,232 A * | 12/1997 | Parsay et al. | 398/42 |
| 5,703,602 A | 12/1997 | Casebolt | |
| 5,708,681 A | 1/1998 | Malkemes et al. | |
| 5,726,984 A | 3/1998 | Kubler et al. | |
| 5,765,099 A | 6/1998 | Georges et al. | |
| 5,790,536 A | 8/1998 | Mahany et al. | |
| 5,790,606 A | 8/1998 | Dent | |
| 5,802,173 A | 9/1998 | Hamilton-Piercy et al. | |
| 5,802,473 A | 9/1998 | Rutledge et al. | |
| 5,805,983 A | 9/1998 | Naidu et al. | |
| 5,809,395 A | 9/1998 | Hamilton-Piercy et al. | |
| 5,809,431 A | 9/1998 | Bustamante et al. | |
| 5,812,296 A | 9/1998 | Tarusawa et al. | |
| 5,818,619 A | 10/1998 | Medved et al. | |
| 5,818,883 A | 10/1998 | Smith et al. | |
| 5,821,510 A | 10/1998 | Cohen et al. | |
| 5,825,651 A | 10/1998 | Gupta et al. | |
| 5,838,474 A | 11/1998 | Stilling | |
| 5,839,052 A | 11/1998 | Dean et al. | |
| 5,852,651 A * | 12/1998 | Fischer et al. | 379/56.2 |
| 5,854,986 A | 12/1998 | Dorren et al. | |
| 5,862,460 A | 1/1999 | Rich | |
| 5,867,485 A | 2/1999 | Chambers et al. | |
| 5,867,763 A | 2/1999 | Dean et al. | |
| 5,873,040 A | 2/1999 | Dunn et al. | |
| 5,880,867 A | 3/1999 | Ronald | |
| 5,881,200 A | 3/1999 | Burt | |
| 5,883,882 A | 3/1999 | Schwartz | |
| 5,896,568 A | 4/1999 | Tseng et al. | |
| 5,903,834 A | 5/1999 | Wallstedt et al. | |
| 5,910,776 A | 6/1999 | Black | |
| 5,913,003 A | 6/1999 | Arroyo et al. | |
| 5,917,636 A | 6/1999 | Wake et al. | |
| 5,930,682 A | 7/1999 | Schwartz et al. | |
| 5,936,754 A | 8/1999 | Ariyavisitakul et al. | |
| 5,943,372 A | 8/1999 | Gans et al. | |
| 5,946,622 A | 8/1999 | Bojeryd | |
| 5,949,564 A | 9/1999 | Wake | |
| 5,953,670 A | 9/1999 | Newson | |
| 5,959,531 A | 9/1999 | Gallagher, III et al. | |
| 5,960,344 A | 9/1999 | Mahany | |
| 5,969,837 A | 10/1999 | Farber et al. | |
| 5,983,070 A | 11/1999 | Georges et al. | |
| 5,987,303 A | 11/1999 | Dutta et al. | |
| 6,005,884 A | 12/1999 | Cook et al. | |
| 6,006,069 A | 12/1999 | Langston | |
| 6,006,105 A | 12/1999 | Rostoker et al. | |
| 6,011,980 A | 1/2000 | Nagano et al. | |
| 6,014,546 A | 1/2000 | Georges et al. | |
| 6,016,426 A | 1/2000 | Bodell | |
| 6,023,625 A | 2/2000 | Myers, Jr. | |
| 6,037,898 A | 3/2000 | Parish et al. | |
| 6,049,312 A | 4/2000 | Lord et al. | |
| 6,069,721 A | 5/2000 | Oh et al. | |
| 6,088,381 A | 7/2000 | Myers, Jr. | |
| 6,118,767 A | 9/2000 | Shen et al. | |
| 6,122,529 A | 9/2000 | Sabat, Jr. et al. | |
| 6,127,917 A | 10/2000 | Tuttle | |
| 6,128,470 A | 10/2000 | Naidu et al. | |
| 6,128,477 A | 10/2000 | Freed | |
| 6,148,041 A | 11/2000 | Dent | |
| 6,150,921 A | 11/2000 | Werb et al. | |
| 6,157,810 A | 12/2000 | Georges et al. | |
| 6,192,216 B1 | 2/2001 | Sabat, Jr. et al. | |
| 6,194,968 B1 | 2/2001 | Winslow | |
| 6,212,397 B1 | 4/2001 | Langston et al. | |
| 6,222,503 B1 | 4/2001 | Gietema | |
| 6,223,201 B1 | 4/2001 | Reznak | |
| 6,232,870 B1 | 5/2001 | Garber et al. | |
| 6,236,365 B1 | 5/2001 | LeBlanc et al. | |
| 6,236,789 B1 | 5/2001 | Fitz | |
| 6,236,863 B1 | 5/2001 | Waldroup et al. | |
| 6,240,274 B1 | 5/2001 | Izadpanah | |
| 6,249,252 B1 | 6/2001 | Dupray | |
| 6,268,946 B1 | 7/2001 | Larkin et al. | |
| 6,275,990 B1 | 8/2001 | Dapper et al. | |
| 6,279,158 B1 | 8/2001 | Geile et al. | |
| 6,292,673 B1 | 9/2001 | Maeda et al. | |
| 6,295,451 B1 | 9/2001 | Mimura | |
| 6,307,869 B1 | 10/2001 | Pawelski | |
| 6,314,163 B1 | 11/2001 | Acampora | |
| 6,317,599 B1 | 11/2001 | Rappaport et al. | |
| 6,323,980 B1 | 11/2001 | Bloom | |
| 6,324,391 B1 | 11/2001 | Bodell | |
| 6,330,241 B1 | 12/2001 | Fort | |
| 6,330,244 B1 | 12/2001 | Swartz et al. | |
| 6,334,219 B1 | 12/2001 | Hill et al. | |
| 6,336,021 B1 | 1/2002 | Nukada | |
| 6,336,042 B1 | 1/2002 | Dawson et al. | |
| 6,337,754 B1 | 1/2002 | Imajo | |
| 6,340,932 B1 | 1/2002 | Rodgers et al. | |
| 6,353,406 B1 | 3/2002 | Lanzl et al. | |
| 6,353,600 B1 | 3/2002 | Schwartz et al. | |
| 6,359,714 B1 | 3/2002 | Imajo | |
| 6,370,203 B1 | 4/2002 | Boesch et al. | |
| 6,374,078 B1 | 4/2002 | Williams et al. | |
| 6,374,124 B1 | 4/2002 | Slabinski | |
| 6,389,010 B1 | 5/2002 | Kubler et al. | |
| 6,400,318 B1 | 6/2002 | Kasami et al. | |
| 6,400,418 B1 | 6/2002 | Wakabayashi | |
| 6,405,018 B1 | 6/2002 | Reudink et al. | |

(56) References Cited

U.S. PATENT DOCUMENTS

| | | | |
|---|---|---|---|
| 6,405,058 B2 | 6/2002 | Bobier |
| 6,405,308 B1 | 6/2002 | Gupta et al. |
| 6,415,132 B1 | 7/2002 | Sabat, Jr. |
| 6,421,327 B1 | 7/2002 | Lundby |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,535,330 B1 | 3/2003 | Lelic et al. |
| 6,535,720 B1 | 3/2003 | Kintis et al. |
| 6,556,551 B1 | 4/2003 | Schwartz |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,704,298 B1 | 3/2004 | Matsumiya et al. |
| 6,704,545 B1 | 3/2004 | Wala |
| 6,710,366 B1 | 3/2004 | Lee et al. |
| 6,731,880 B2 | 5/2004 | Westbrook et al. |
| 6,745,013 B1 | 6/2004 | Porter et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,842,433 B2 | 1/2005 | West et al. |
| 6,847,856 B1 | 1/2005 | Bohannon |
| 6,850,510 B2 | 2/2005 | Kubler |
| 6,865,390 B2 | 3/2005 | Goss et al. |
| 6,873,823 B2 | 3/2005 | Hasarchi |
| 6,876,056 B2 | 4/2005 | Tilmans et al. |
| 6,876,945 B2 | 4/2005 | Elmord |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,895,185 B1 | 5/2005 | Chung et al. |
| 6,909,399 B1 | 6/2005 | Zegelin et al. |
| 6,915,058 B2 | 7/2005 | Pons |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,659 B1 | 8/2005 | Kinemura |
| 6,931,813 B2 | 8/2005 | Collie |
| 6,933,849 B2 | 8/2005 | Sawyer |
| 6,934,511 B1 | 8/2005 | Lovinggood et al. |
| 6,934,541 B2 | 8/2005 | Miyatani |
| 6,941,112 B2 | 9/2005 | Hasegawa |
| 6,952,181 B2 | 10/2005 | Karr et al. |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,024,166 B2 | 4/2006 | Wallace |
| 7,035,512 B2 | 4/2006 | Van Bijsterveld |
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,103,119 B2 | 9/2006 | Matsuoka et al. |
| 7,103,377 B2 | 9/2006 | Bauman et al. |
| 7,106,931 B2 | 9/2006 | Sutehall et al. |
| 7,110,795 B2 | 9/2006 | Doi |
| 7,127,176 B2 | 10/2006 | Sasaki |
| 7,142,503 B1 | 11/2006 | Grant et al. |
| 7,142,535 B2 | 11/2006 | Kubler et al. |
| 7,142,619 B2 | 11/2006 | Sommer et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,194,275 B2 | 3/2007 | Bolin et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,263,293 B2 | 8/2007 | Ommodt et al. |
| 7,269,311 B2 | 9/2007 | Kim et al. |
| 7,277,478 B2 | 10/2007 | Friedrich et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,298,327 B2 | 11/2007 | Dupray et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,336,961 B1 | 2/2008 | Ngan |
| 7,343,164 B2 | 3/2008 | Kallstenius |
| 7,349,633 B2 | 3/2008 | Lee et al. |
| 7,359,408 B2 | 4/2008 | Kim |

(56) References Cited

U.S. PATENT DOCUMENTS

| | | | |
|---|---|---|---|
| 7,359,647 | B1 | 4/2008 | Faria et al. |
| 7,359,674 | B2 | 4/2008 | Markki et al. |
| 7,366,150 | B2 | 4/2008 | Lee et al. |
| 7,366,151 | B2 | 4/2008 | Kubler et al. |
| 7,369,526 | B2 | 5/2008 | Lechleider et al. |
| 7,379,669 | B2 | 5/2008 | Kim |
| 7,392,025 | B2 | 6/2008 | Rooyen et al. |
| 7,392,029 | B2 | 6/2008 | Pronkine |
| 7,394,883 | B2 | 7/2008 | Funakubo et al. |
| 7,395,181 | B2 | 7/2008 | Foxlin |
| 7,403,156 | B2 | 7/2008 | Coppi et al. |
| 7,409,159 | B2 | 8/2008 | Izadpanah |
| 7,412,224 | B2 | 8/2008 | Kotola et al. |
| 7,424,228 | B1 | 9/2008 | Williams et al. |
| 7,444,051 | B2 | 10/2008 | Tatat et al. |
| 7,450,853 | B2 | 11/2008 | Kim et al. |
| 7,450,854 | B2 | 11/2008 | Lee et al. |
| 7,451,365 | B2 | 11/2008 | Wang et al. |
| 7,460,507 | B2 | 12/2008 | Kubler et al. |
| 7,460,829 | B2 | 12/2008 | Utsumi et al. |
| 7,460,831 | B2 | 12/2008 | Hasarchi |
| 7,466,925 | B2 | 12/2008 | Iannelli |
| 7,469,105 | B2 | 12/2008 | Wake et al. |
| 7,477,597 | B2 | 1/2009 | Segel |
| 7,483,504 | B2 | 1/2009 | Shapira et al. |
| 7,483,711 | B2 | 1/2009 | Burchfiel |
| 7,496,070 | B2 | 2/2009 | Vesuna |
| 7,496,384 | B2 | 2/2009 | Seto et al. |
| 7,505,747 | B2 | 3/2009 | Solum |
| 7,512,419 | B2 | 3/2009 | Solum |
| 7,522,552 | B2 | 4/2009 | Fein et al. |
| 7,525,484 | B2 | 4/2009 | Dupray et al. |
| 7,539,509 | B2 | 5/2009 | Bauman et al. |
| 7,542,452 | B2 | 6/2009 | Penumetsa |
| 7,546,138 | B2 | 6/2009 | Bauman |
| 7,548,138 | B2 | 6/2009 | Kamgaing |
| 7,548,695 | B2 | 6/2009 | Wake |
| 7,551,641 | B2 | 6/2009 | Pirzada et al. |
| 7,557,758 | B2 | 7/2009 | Rofougaran |
| 7,565,170 | B2 | 7/2009 | Buscaglia et al. |
| 7,580,384 | B2 | 8/2009 | Kubler et al. |
| 7,586,861 | B2 | 9/2009 | Kubler et al. |
| 7,590,354 | B2 | 9/2009 | Sauer et al. |
| 7,599,420 | B2 | 10/2009 | Forenza et al. |
| 7,610,046 | B2 | 10/2009 | Wala |
| 7,630,690 | B2 | 12/2009 | Kaewell, Jr. et al. |
| 7,633,934 | B2 | 12/2009 | Kubler et al. |
| 7,639,982 | B2 | 12/2009 | Wala |
| 7,646,743 | B2 | 1/2010 | Kubler et al. |
| 7,646,777 | B2 | 1/2010 | Hicks, III et al. |
| 7,653,397 | B2 | 1/2010 | Pernu et al. |
| 7,668,565 | B2 | 2/2010 | Ylänen et al. |
| 7,688,811 | B2 | 3/2010 | Kubler et al. |
| 7,693,486 | B2 | 4/2010 | Kasslin et al. |
| 7,697,467 | B2 | 4/2010 | Kubler et al. |
| 7,714,778 | B2 | 5/2010 | Dupray |
| 7,715,375 | B2 | 5/2010 | Kubler et al. |
| 7,751,368 | B2 | 7/2010 | Li et al. |
| 7,751,374 | B2 | 7/2010 | Donovan |
| 7,751,715 | B2 | 7/2010 | Takami et al. |
| 7,751,838 | B2 | 7/2010 | Ramesh et al. |
| 7,760,703 | B2 | 7/2010 | Kubler et al. |
| 7,764,231 | B1 | 7/2010 | Karr et al. |
| 7,768,951 | B2 | 8/2010 | Kubler et al. |
| 7,773,573 | B2 | 8/2010 | Chung et al. |
| 7,778,603 | B2 | 8/2010 | Palin et al. |
| 7,792,502 | B2 | 9/2010 | Baker |
| 7,796,965 | B2 | 9/2010 | Moser et al. |
| 7,809,012 | B2 | 10/2010 | Ruuska et al. |
| 7,812,766 | B2 | 10/2010 | Leblanc et al. |
| 7,817,969 | B2 | 10/2010 | Castaneda et al. |
| 7,835,328 | B2 | 11/2010 | Stephens et al. |
| 7,839,289 | B2 | 11/2010 | Chung et al. |
| 7,848,316 | B2 | 12/2010 | Kubler et al. |
| 7,848,770 | B2 | 12/2010 | Scheinert |
| 7,853,234 | B2 | 12/2010 | Afsahi |
| 7,860,518 | B2 | 12/2010 | Flanagan et al. |
| 7,870,321 | B2 | 1/2011 | Rofougaran |
| 7,881,755 | B1 | 2/2011 | Mishra et al. |
| 7,894,423 | B2 | 2/2011 | Kubler et al. |
| 7,899,007 | B2 | 3/2011 | Kubler et al. |
| 7,903,029 | B2 | 3/2011 | Dupray |
| 7,907,972 | B2 | 3/2011 | Walton et al. |
| 7,912,043 | B2 | 3/2011 | Kubler et al. |
| 7,912,430 | B2 | 3/2011 | Kargl et al. |
| 7,916,706 | B2 | 3/2011 | Kubler et al. |
| 7,917,177 | B2 | 3/2011 | Bauman |
| 7,920,553 | B2 | 4/2011 | Kubler et al. |
| 7,920,858 | B2 | 4/2011 | Sabat, Jr. et al. |
| 7,924,783 | B1 | 4/2011 | Mahany et al. |
| 7,936,713 | B2 | 5/2011 | Kubler et al. |
| 7,937,051 | B2 | 5/2011 | Vaisanen |
| 7,949,364 | B2 | 5/2011 | Kasslin et al. |
| 7,957,777 | B1 | 6/2011 | Vu et al. |
| 7,962,111 | B2 | 6/2011 | Solum |
| 7,969,009 | B2 | 6/2011 | Chandrasekaran |
| 7,969,911 | B2 | 6/2011 | Mahany et al. |
| 7,990,925 | B2 | 8/2011 | Tinnakornsrisuphap et al. |
| 7,996,020 | B1 | 8/2011 | Chhabra |
| 8,005,050 | B2 | 8/2011 | Scheinert et al. |
| 8,018,907 | B2 | 9/2011 | Kubler et al. |
| 8,032,153 | B2 | 10/2011 | Dupray et al. |
| 8,036,308 | B2 | 10/2011 | Rofougaran |
| 8,044,804 | B1 | 10/2011 | McReynolds |
| 8,072,381 | B1 | 12/2011 | Ziegler |
| 8,081,923 | B1 | 12/2011 | Larsen et al. |
| 8,082,096 | B2 | 12/2011 | Dupray |
| 8,082,353 | B2 | 12/2011 | Huber et al. |
| 8,086,192 | B2 | 12/2011 | Rofougaran et al. |
| 8,135,413 | B2 | 3/2012 | Dupray |
| 8,175,459 | B2 | 5/2012 | Thelen et al. |
| 2001/0036199 | A1 | 11/2001 | Terry |
| 2002/0003645 | A1 | 1/2002 | Kim et al. |
| 2002/0048071 | A1 | 4/2002 | Suzuki et al. |
| 2002/0051434 | A1 | 5/2002 | Ozluturk et al. |
| 2002/0075906 | A1 | 6/2002 | Cole et al. |
| 2002/0092347 | A1 | 7/2002 | Niekerk et al. |
| 2002/0111192 | A1 | 8/2002 | Thomas et al. |
| 2002/0114038 | A1 | 8/2002 | Arnon et al. |
| 2002/0123365 | A1 | 9/2002 | Thorson et al. |
| 2002/0126967 | A1 | 9/2002 | Panak et al. |
| 2002/0130778 | A1 | 9/2002 | Nicholson |
| 2002/0141020 | A1* | 10/2002 | Doucet et al. ............... 359/172 |
| 2002/0181668 | A1 | 12/2002 | Masoian et al. |
| 2002/0190845 | A1 | 12/2002 | Moore |
| 2003/0007214 | A1 | 1/2003 | Aburakawa et al. |
| 2003/0016418 | A1 | 1/2003 | Westbrook et al. |
| 2003/0034963 | A1* | 2/2003 | Moon et al. ............... 345/204 |
| 2003/0045284 | A1 | 3/2003 | Copley et al. |
| 2003/0078074 | A1 | 4/2003 | Sesay et al. |
| 2003/0141962 | A1 | 7/2003 | Barink |
| 2003/0146871 | A1 | 8/2003 | Karr et al. |
| 2003/0157943 | A1 | 8/2003 | Sabat, Jr. |
| 2003/0161637 | A1 | 8/2003 | Yamamoto et al. |
| 2003/0165287 | A1 | 9/2003 | Krill et al. |
| 2003/0174099 | A1 | 9/2003 | Bauer et al. |
| 2003/0179077 | A1 | 9/2003 | Hartmann et al. |
| 2003/0202794 | A1 | 10/2003 | Izadpanah et al. |
| 2003/0209601 | A1 | 11/2003 | Chung |
| 2004/0001719 | A1 | 1/2004 | Sasaki |
| 2004/0008114 | A1 | 1/2004 | Sawyer |
| 2004/0017785 | A1 | 1/2004 | Zelst |
| 2004/0041714 | A1 | 3/2004 | Forster |
| 2004/0043764 | A1 | 3/2004 | Bigham et al. |
| 2004/0047313 | A1 | 3/2004 | Rumpf et al. |
| 2004/0078151 | A1 | 4/2004 | Aljadeff et al. |
| 2004/0095907 | A1 | 5/2004 | Agee et al. |
| 2004/0100930 | A1 | 5/2004 | Shapira et al. |
| 2004/0102196 | A1 | 5/2004 | Weckstrom et al. |
| 2004/0110469 | A1* | 6/2004 | Judd et al. ............... 455/15 |
| 2004/0146020 | A1 | 7/2004 | Kubler et al. |
| 2004/0149736 | A1 | 8/2004 | Clothier |
| 2004/0151164 | A1 | 8/2004 | Kubler et al. |
| 2004/0151503 | A1 | 8/2004 | Kashima et al. |

(56) References Cited

U.S. PATENT DOCUMENTS

| | | |
|---|---|---|
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0198386 A1 | 10/2004 | Dupray |
| 2004/0202257 A1 | 10/2004 | Mehta et al. |
| 2004/0203704 A1* | 10/2004 | Ommodt et al. ............ 455/422.1 |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0218873 A1 | 11/2004 | Nagashima et al. |
| 2004/0224644 A1 | 11/2004 | Wu et al. |
| 2004/0233877 A1 | 11/2004 | Lee et al. |
| 2004/0258105 A1 | 12/2004 | Spathas et al. |
| 2004/0264683 A1 | 12/2004 | Bye |
| 2005/0020309 A1 | 1/2005 | Moeglin et al. |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0068251 A1 | 3/2005 | Ebling et al. |
| 2005/0076982 A1 | 4/2005 | Metcalf et al. |
| 2005/0078006 A1 | 4/2005 | Hutchins |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0141545 A1 | 6/2005 | Fein et al. |
| 2005/0143077 A1 | 6/2005 | Charbonneau |
| 2005/0143091 A1 | 6/2005 | Shapira et al. |
| 2005/0147071 A1 | 7/2005 | Karaoguz et al. |
| 2005/0148306 A1 | 7/2005 | Hiddink |
| 2005/0153712 A1 | 7/2005 | Osaka et al. |
| 2005/0159108 A1 | 7/2005 | Fletcher |
| 2005/0162256 A1 | 7/2005 | Kinoshita |
| 2005/0174236 A1 | 8/2005 | Brookner |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1* | 12/2005 | Niiho et al. .................... 455/445 |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin et al. |
| 2006/0017633 A1 | 1/2006 | Pronkine |
| 2006/0025158 A1 | 2/2006 | Leblanc et al. |
| 2006/0045054 A1 | 3/2006 | Utsumi et al. |
| 2006/0062579 A1 | 3/2006 | Kim et al. |
| 2006/0066443 A1 | 3/2006 | Hall |
| 2006/0071756 A1 | 4/2006 | Steeves |
| 2006/0094470 A1 | 5/2006 | Wake et al. |
| 2006/0104643 A1 | 5/2006 | Lee et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0209752 A1 | 9/2006 | Wijngaarden et al. |
| 2006/0233506 A1 | 10/2006 | Noonan et al. |
| 2006/0239630 A1 | 10/2006 | Hase et al. |
| 2006/0274704 A1 | 12/2006 | Desai et al. |
| 2006/0276202 A1 | 12/2006 | Moeglein et al. |
| 2006/0279460 A1 | 12/2006 | Yun et al. |
| 2007/0001854 A1 | 1/2007 | Chung et al. |
| 2007/0009266 A1 | 1/2007 | Bothwell |
| 2007/0018820 A1 | 1/2007 | Chand et al. |
| 2007/0019679 A1 | 1/2007 | Scheck et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0104128 A1 | 5/2007 | Laroia et al. |
| 2007/0104164 A1 | 5/2007 | Laroia et al. |
| 2007/0122155 A1 | 5/2007 | Hillis et al. |
| 2007/0140168 A1 | 6/2007 | Laroia et al. |
| 2007/0149250 A1 | 6/2007 | Crozzoli et al. |
| 2007/0164609 A1* | 7/2007 | Shalam et al. ............... 307/10.1 |
| 2007/0166042 A1 | 7/2007 | Seeds et al. |
| 2007/0224954 A1 | 9/2007 | Gopi |
| 2007/0253355 A1 | 11/2007 | Hande et al. |
| 2007/0253714 A1 | 11/2007 | Seeds et al. |
| 2007/0268853 A1 | 11/2007 | Ma et al. |
| 2007/0274279 A1 | 11/2007 | Wood et al. |
| 2007/0285239 A1 | 12/2007 | Easton et al. |
| 2007/0297005 A1 | 12/2007 | Montierth et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0077326 A1 | 3/2008 | Funk et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0119208 A1 | 5/2008 | Flanagan et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0137635 A1 | 6/2008 | Pan et al. |
| 2008/0145061 A1 | 6/2008 | Lee et al. |
| 2008/0150514 A1 | 6/2008 | Codreanu et al. |
| 2008/0167049 A1 | 7/2008 | Karr et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232799 A1 | 9/2008 | Kim |
| 2008/0247716 A1 | 10/2008 | Thomas |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310848 A1 | 12/2008 | Yasuda et al. |
| 2009/0005063 A1 | 1/2009 | Malik et al. |
| 2009/0005064 A1 | 1/2009 | Malik et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0061941 A1 | 3/2009 | Clark |
| 2009/0073916 A1 | 3/2009 | Zhang et al. |
| 2009/0103919 A1 | 4/2009 | Mickelsson et al. |
| 2009/0135078 A1 | 5/2009 | Lindmark et al. |
| 2009/0149221 A1 | 6/2009 | Liu et al. |
| 2009/0154621 A1 | 6/2009 | Shapira et al. |
| 2009/0163224 A1 | 6/2009 | Dean et al. |
| 2009/0175214 A1 | 7/2009 | Sfar et al. |
| 2009/0176507 A1 | 7/2009 | Wu et al. |
| 2009/0191891 A1 | 7/2009 | Ma et al. |

(56) References Cited

U.S. PATENT DOCUMENTS

| | | |
|---|---|---|
| 2009/0218407 A1 | 9/2009 | Rofougaran |
| 2009/0218657 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252205 A1 | 10/2009 | Rheinfelder et al. |
| 2009/0258652 A1 | 10/2009 | Lambert et al. |
| 2009/0285147 A1 | 11/2009 | Subasic et al. |
| 2010/0002626 A1 | 1/2010 | Schmidt et al. |
| 2010/0007485 A1 | 1/2010 | Kodrin et al. |
| 2010/0027443 A1 | 2/2010 | LoGalbo et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0128568 A1 | 5/2010 | Han et al. |
| 2010/0134257 A1 | 6/2010 | Puleston et al. |
| 2010/0148373 A1 | 6/2010 | Chandrasekaran |
| 2010/0156721 A1 | 6/2010 | Alamouti et al. |
| 2010/0178936 A1 | 7/2010 | Wala et al. |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0234045 A1 | 9/2010 | Karr et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0273504 A1 | 10/2010 | Bull et al. |
| 2010/0279633 A1 | 11/2010 | Baker |
| 2010/0290355 A1 | 11/2010 | Roy et al. |
| 2010/0291949 A1 | 11/2010 | Shapira et al. |
| 2010/0309049 A1 | 12/2010 | Reunamëki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0028157 A1 | 2/2011 | Larsen |
| 2011/0028161 A1 | 2/2011 | Larsen |
| 2011/0050501 A1 | 3/2011 | Aljadeff |
| 2011/0055875 A1 | 3/2011 | Zussman |
| 2011/0065450 A1 | 3/2011 | Kazmi |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116572 A1 | 5/2011 | Lee et al. |
| 2011/0124347 A1 | 5/2011 | Chen et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0159876 A1 | 6/2011 | Segall et al. |
| 2011/0159891 A1 | 6/2011 | Segall et al. |
| 2011/0171912 A1 | 7/2011 | Beck et al. |
| 2011/0171946 A1 | 7/2011 | Soehren |
| 2011/0171973 A1 | 7/2011 | Beck et al. |
| 2011/0182230 A1 | 7/2011 | Ohm et al. |
| 2011/0193958 A1 | 8/2011 | Martin et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0210843 A1 | 9/2011 | Kummetz |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0274021 A1 | 11/2011 | He et al. |
| 2011/0281536 A1 | 11/2011 | Lee et al. |
| 2012/0039320 A1 | 2/2012 | Lemson et al. |
| 2012/0058775 A1 | 3/2012 | Dupray et al. |
| 2012/0081248 A1 | 4/2012 | Kennedy et al. |
| 2012/0087212 A1 | 4/2012 | Vartanian et al. |
| 2012/0130632 A1 | 5/2012 | Bandyopadhyay et al. |

FOREIGN PATENT DOCUMENTS

| | | |
|---|---|---|
| CA | 2065090 C | 2/1998 |
| CA | 2242707 A1 | 1/1999 |
| DE | 20104862 U1 | 8/2001 |
| DE | 10249414 A1 | 5/2004 |
| EP | 0477952 A2 | 4/1992 |
| EP | 0461583 B1 | 3/1997 |
| EP | 0851618 A2 | 7/1998 |
| EP | 0687400 B1 | 11/1998 |
| EP | 0993124 A2 | 4/2000 |
| EP | 1173034 A1 | 1/2002 |
| EP | 1202475 A2 | 5/2002 |
| EP | 1227605 A2 | 7/2002 |
| EP | 1267447 A1 | 12/2002 |
| EP | 0993124 A3 | 4/2003 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1693974 A1 | 8/2006 |
| EP | 1742388 A1 | 1/2007 |
| EP | 1227605 B1 | 1/2008 |
| EP | 1954019 A1 | 8/2008 |
| EP | 1968250 A1 | 9/2008 |
| EP | 1056226 B1 | 4/2009 |
| EP | 1357683 B1 | 5/2009 |
| GB | 2323252 A | 9/1998 |
| GB | 2399963 A | 9/2004 |
| GB | 2428149 A | 1/2007 |
| JP | 05260018 A | 10/1993 |
| JP | 09083450 A | 3/1997 |
| JP | 09162810 A | 6/1997 |
| JP | 09200840 A | 7/1997 |
| JP | 11068675 A | 3/1999 |
| JP | 2000152300 A | 5/2000 |
| JP | 2000341744 A | 12/2000 |
| JP | 2002264617 A | 9/2002 |
| JP | 2002353813 A | 12/2002 |
| JP | 2003148653 A | 5/2003 |
| JP | 2003172827 A | 6/2003 |
| JP | 2004172734 A | 6/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| JP | 2009288245 A | 12/2009 |
| WO | 9603823 A1 | 2/1996 |
| WO | 0042721 A1 | 7/2000 |
| WO | 0072475 A1 | 11/2000 |
| WO | 0178434 A1 | 10/2001 |
| WO | 0184760 A1 | 11/2001 |

(56) References Cited

FOREIGN PATENT DOCUMENTS

| WO | 0221183 A1 | 3/2002 |
|---|---|---|
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006051262 A1 | 5/2006 |
| WO | 2006133609 A1 | 12/2006 |
| WO | 2006136811 A1 | 12/2006 |
| WO | 2007048427 A1 | 5/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008021442 A2 | 2/2008 |
| WO | 2008027213 A2 | 3/2008 |
| WO | 2008033298 A2 | 3/2008 |
| WO | 2008039830 A2 | 4/2008 |
| WO | 2008099383 A2 | 8/2008 |
| WO | 2008099390 A2 | 8/2008 |
| WO | 2006046088 A1 | 5/2009 |
| WO | 2009081376 A2 | 7/2009 |
| WO | 2009097237 A1 | 8/2009 |
| WO | 2010090999 A1 | 8/2010 |
| WO | 2011017700 A1 | 2/2011 |
| WO | 2011091859 A1 | 8/2011 |
| WO | 2011123336 A1 | 10/2011 |

OTHER PUBLICATIONS

Cho, Bong Youl et al. "The Forward Link Performance of a PCS System with an AGC," 4th CDMA International Conference and Exhibition, "The Realization of IMT-2000," 1999, 10 pages.
Chu, Ta-Shing et al. "Fiber optic microcellular radio", IEEE Transactions on Vehicular Technology, Aug. 1991, pp. 599-606, vol. 40, Issue 3.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Windyka, John et al., "System-Level Integrated Circuit (SLIC) Technology Development for Phased Array Antenna Applications," Contractor Report 204132, National Aeronautics and Space Administration, Jul. 1997, 94 pages.

Non-final Office Action for U.S. Appl. No. 13/439,996 mailed May 10, 2013, 14 pages.
Cooper, A.J., "Fiber/Radio for the Provision of Cordless/Mobile Telephony Services in the Access Network," Electronics Letters, 1990, pp. 2054-2056, vol. 26.
Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, 3 pages.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.
Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.
Author Unknown, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 20 pages.
Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.
Liu, C.P. et al., "Broadband Access Using Wireless-Over-Fibre Technologies," BT Technology Journal, vol. 24, No. 3, Jul. 2006, pp. 130-143.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2001, pp. 271-282.
Author Unknown, RFID Technology Overview, 11 pages.
Roh, W., et al., "MIMO Channel Capacity for the Distributed Antenna Systems," Proceedings of the 56th IEEE Vehicular Technology Conference, Sep. 2002, vol. 2, pp. 706-709.
Schubert, H. et al., "Wireless Access to ATM-Network Based on Optical Microwave Generation," Vehicular Technology Conference, 1997, IEEE, vol. 1, May 4, 1997, pp. 275-279.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept n Wireless Network Infrastructure," Electronics Letters, Feb. 27, 1997, vol. 33, No. 5, pp. 404-406.
Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.
International Search Report for PCT/US07/21041 mailed Mar. 7, 2008, 3 pages.

(56) References Cited

OTHER PUBLICATIONS

Non-final Office Action for U.S. Appl. No. 13/439,996 mailed Nov. 18, 2013, 10 pages.

Non-final Office Action for U.S. Appl. No. 13/342,468 mailed Nov. 4, 2013, 20 pages.

Author Unknown, "Safe Campus Solutions: Going Beyond Emergency Notification," Strategic White Paper, Alcatel-Lucent, Sep. 2008, 8 pages.

Author Unknown, "Cellular Specialties Introduces the First Simulcasted In-building Location-Based Tracking Solution," http://smart-grid.tmcnet.com/news/2009/09/14/4368300.htm, 2 pages.

Girard et al., "Indoor Pedestrian Navigation Using Foot-Mounted IMU and Portable Ultrasound Range Sensors," Open Access Article, Sensors, vol. 11, Issue 8, Aug. 2, 2011, 19 pages.

Kim et al., "Smartphone-Based Collaborative and Autonomous Radio Fingerprinting," IEEE Transactions on Systems, Man, and Cybernetics—Part C: Applications and Reviews, vol. 42, No. 1, Jan. 2012, pp. 112-122.

Mokni et al., "Coupled sonar inertial navigation system for pedestrian tracking," 13th Conference on Information Fusion, presented Jul. 26-29, 2010, Edinburgh, Scotland, IEEE, 8 pages.

Non-final Office Action for U.S. Appl. No. 13/342,468 mailed Apr. 25, 2014, 22 pages.

Final Office Action for U.S. Appl. No. 13/342,468 mailed Sep. 4, 2014, 24 pages.

\* cited by examiner

MULTI-PORT ACCUMULATOR FOR RADIO-OVER-FIBER (ROF) WIRELESS PICOCELLULAR SYSTEMS

RELATED APPLICATIONS

The application is a continuation of U.S. patent application Ser. No. 11/880,839 filed on Jul. 24, 2007 now abandoned, the content of which is relied upon and incorporated herein by reference in its entirety, and the benefit of priority under 35 U.S.C. §120 is hereby claimed.

BACKGROUND OF THE INVENTION

1. Field of the Invention

The present invention relates generally to wireless communication systems, and in particular relates to transponders and transponder systems and methods used in optical-fiber-based wireless picocellular systems for radio-over-fiber (RoF) communication.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (coffee shops, airports, libraries, etc.). Wireless communication systems communicate with wireless devices called "clients," which must reside within the wireless range or "cell coverage area" in order to communicate with the access point device.

One approach to deploying a wireless communication system involves the use of "picocells," which are radio-frequency (RF) coverage areas having a radius in the range from about a few meters up to about 20 meters. Because a picocell covers a small area, there are typically only a few users (clients) per picocell. Picocells also allow for selective wireless coverage in small regions that otherwise would have poor signal strength when covered by larger cells created by conventional base stations.

In conventional wireless systems, picocells are created by and centered on a wireless access point device connected to a head-end controller. The wireless access point device includes digital information processing electronics, an RF transmitter/receiver, and an antenna operably connected to the RF transmitter/receiver. The size of a given picocell is determined by the amount of RF power transmitted by the access point device, the receiver sensitivity, antenna gain and the RF environment, as well as by the RF transmitter/receiver sensitivity of the wireless client device. Client devices usually have a fixed RF receiver sensitivity, so that the above-mentioned properties of the access point device mainly determine the picocell size. Combining a number of access point devices connected to the head-end controller creates an array of picocells that cover an area called a "picocellular coverage area." A closely packed picocellular array provides high per-user data-throughput over the picocellular coverage area.

Prior art wireless systems and networks are wire-based signal distribution systems where the access point devices are treated as separate processing units linked to a central location. This makes the wireless system/network relatively complex and difficult to scale, particularly when many picocells need to cover a large region. Further, the digital information processing performed at the access point devices requires that these devices be activated and controlled by the head-end controller, which further complicates the distribution and use of numerous access point devices to produce a large picocellular coverage area.

Radio-over-Fiber (RoF) wireless picocellular systems utilized optical fibers to transmit the RF signals to RoF transponders that convert the RF optical signals to electrical RF signals and then to wireless electromagnetic (EM) signals, and vice versa. Unlike conventional wireless system access points, the RoF transponders generally do not require any signal processing capability, thereby simplifying the distribution of the RoF transponders to produce a large picocellular coverage area.

While RoF wireless picocellular systems are generally robust, there are some shortcomings. One shortcoming relates to the relative difficulty in manufacturing and deploying an optical fiber cable having a linear array of transponders. Each transponder needs to be optically coupled to an uplink optical fiber and a downlink optical fiber as well as to an electrical power line, usually via a "tether cable." This involves the tedious and time-consuming process of accessing the uplink and downlink optical fibers and the electrical power line in the cable, splicing the optical fibers and electrical power line, and then connecting them to the transponder. Another shortcoming of the linear array approach for distributing transponders is that the approach is not readily scalable once the system is deployed. This makes it difficult to quickly and inexpensively change the picocell coverage area to accommodate the changing needs or geometry of the particular wireless environment.

SUMMARY OF THE INVENTION

One aspect of the invention is a multi-port accumulator apparatus for operably supporting two or more RoF transponders and for providing a connection to a tail cable that carries uplink and downlink optical signals and electrical power. The apparatus includes a housing and two or more RoF transponder ports supported by the housing, with each RoF transponder port configured to operably connect to one of the RoF transponders. The apparatus also includes a tail cable port supported by the housing and configured to operably connect to the tail cable. The tail cable port is optically and electrically connected to each RoF transponder port so as to provide the uplink and downlink optical signals and the electrical power to each RoF transponder.

Another aspect of the invention is a method of forming a RoF wireless picocellular coverage area. The method includes operably supporting two or more RoF transponders on a housing, and providing downlink optical signals for the RoF transponders to a tail cable port on the housing via a tail cable. The method further includes distributing the downlink optical signals through the housing to one or more of the RoF transponders so that the one or more RoF transponders contribute to forming a picocellular coverage area.

Another aspect of the invention is a multi-port accumulator apparatus for supporting a plurality of RoF transponders for a RoF wireless picocellular system. The apparatus includes a housing, and a plurality of RoF transponder ports supported by the housing. Each RoF transponder port is adapted to operably connect with one of the RoF transponders. The apparatus also includes a tail cable optically coupled within the housing to the plurality of RoF transponder ports so as to provide for optical transmission of uplink and downlink optical signals between the tail cable and the plurality of RoF transponder ports. The tail cable is also electrically coupled within the housing to the plurality of RoF transponder ports so as to provide electrical power to each of the plurality of RoF transponder ports.

Additional features and advantages of the invention are set forth in the detailed description that follows, and will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

Accordingly, various basic electronic circuit elements and signal-conditioning components, such as bias tees, RF filters, amplifiers, power dividers, etc., are not all shown in the Figures for ease of explanation and illustration. The application of such basic electronic circuit elements and components to the systems of the present invention will be apparent to one skilled in the art.

DETAILED DESCRIPTION OF THE INVENTION

Reference is now made in detail to certain embodiments of the invention, examples of which are illustrated in the accompanying drawings. Whenever possible, the same or analogous reference numbers are used throughout the drawings to refer to the same or like parts.

Generalized Optical-Fiber-Based RoF Wireless Picocellular System

Figure 1:
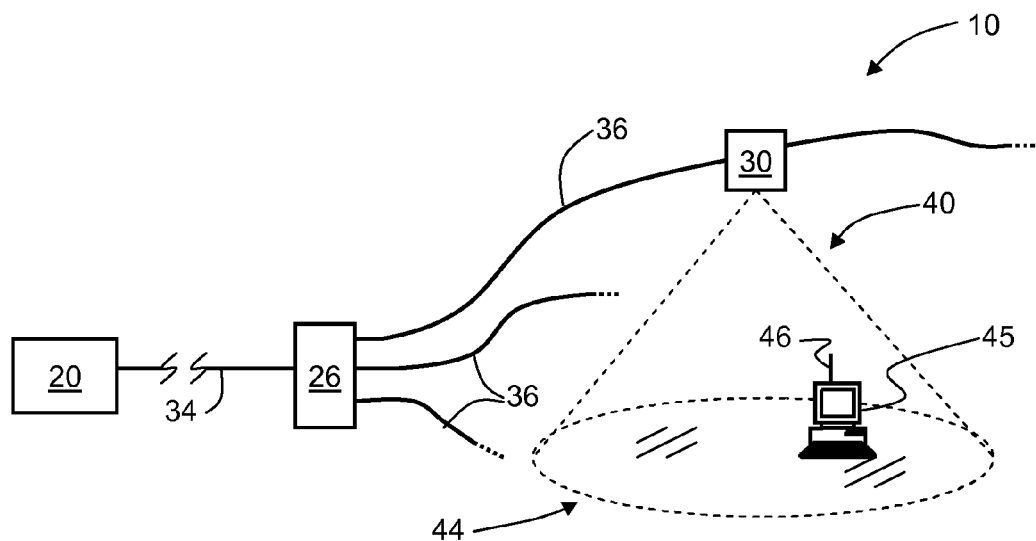
FIG. 1 is a schematic diagram of a generalized embodiment of an optical-fiber-based RoF wireless picocellular system showing a single transponder and its associated picocell and picocell coverage area.

FIG. 1 is a schematic diagram of a generalized example embodiment of an optical-fiber-based RoF wireless picocellular system 10. System 10 includes a head-end unit 20, a distribution unit 26, at least one RoF transponder unit ("transponder") 30, a primary optical fiber RF communication link 34 that optically couples the head-end unit to the distribution unit, and at least one secondary optical fiber RF communication link 36 that couples one or more transponders to the distribution unit, thus establishing a connection between the transponder(s) and the head-end unit. In an example embodiment, optical fiber RF communication links 34 and 36 include at least one optical fiber, and preferably two optical fibers (e.g., uplink and downlink optical fibers, as discussed below). As discussed in detail below, system 10 is adapted to form a picocell 40 substantially centered about transponder 30. One or more transponders 30 form a picocellular coverage area 44. Distribution unit 26 is adapted to divide the primary optical fiber RF communication link 34 into a number of secondary RF optical fiber communication links (hereinafter, "tail cables") 36 that facilitate distributing a number of transponders 30 throughout a given infrastructure.

Head-end unit 20 is adapted to perform or to facilitate any one of a number of RoF applications, such as radio-frequency identification (RFID), wireless local-area network (WLAN) communication, or cellular phone service to provide non-limiting examples. Shown within picocell 40 is a client device 45 in the form of a computer. Client device 45 includes an antenna 46 (e.g., a wireless card) adapted to receive and/or send wireless electromagnetic RF signals.

Figure 2:
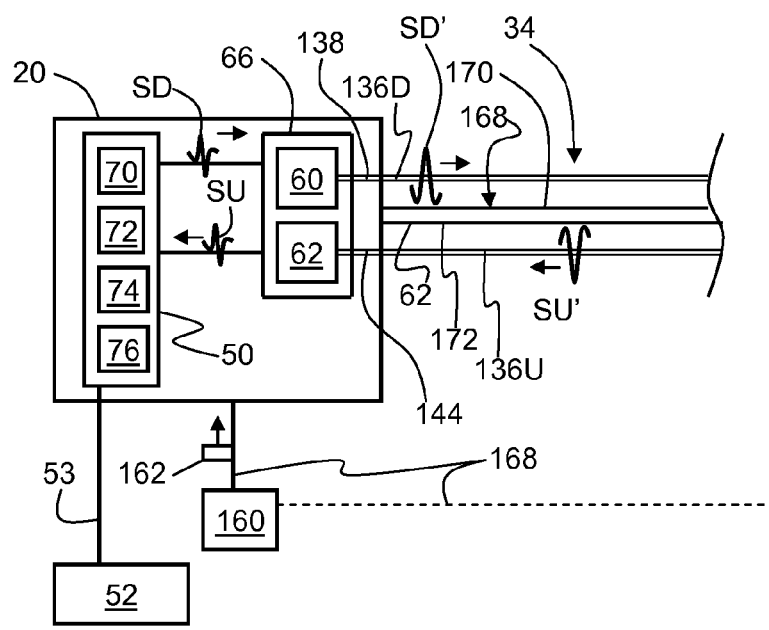
FIG. 2 is a detailed schematic diagram of an example embodiment of a head-end unit for the system of FIG. 1.

FIG. 2 is a detailed schematic diagram of an example embodiment of head-end unit 20 of system 10 of FIG. 1. Head-end unit 20 includes a service unit 50 that provides electrical RF service signals for a particular wireless service or application. In an example embodiment, service unit 50 provides electrical RF service signals by passing (or conditioning and then passing) such signals from one or more outside networks 52. In a particular example embodiment, this includes providing WLAN signal distribution as specified in the IEEE 802.11 standard, i.e., in the frequency range from 2.4 to 2.5 GHz and from 5.0 to 6.0 GHz. In another example embodiment, service unit 50 provides electrical RF service signals by generating the signals directly. In another example embodiment, service unit 50 coordinates the delivery of the electrical RF service signals between client devices within picocellular coverage area 44.

Service unit 50 is electrically coupled to an electrical-to-optical (E/O) converter 60 that receives an electrical RF service signal from the service unit and converts it to a corresponding optical signal. In an example embodiment, E/O converter 60 includes a laser suitable for delivering sufficient dynamic range for the RF-over-fiber applications of the present invention, and optionally includes a laser driver/amplifier electrically coupled to the laser. Examples of suitable lasers for E/O converter 60 include laser diodes, distributed feedback (DFB) lasers, Fabry-Perot (FP) lasers, and vertical cavity surface emitting lasers (VCSELs).

Head-end unit 20 also includes an optical-to-electrical (O/E) converter 62 electrically coupled to service unit 50. O/E converter 62 receives an optical RF service signal and converts it to a corresponding electrical signal. In an example embodiment, O/E converter is a photodetector, or a photodetector electrically coupled to a linear amplifier. E/O converter 60 and O/E converter 62 constitute a "converter pair unit" 66.

In an example embodiment, service unit 50 includes an RF signal modulator/demodulator (M/D) unit 70 that generates an RF carrier of a given frequency and then modulates RF signals onto the carrier, and that also demodulates received RF signals. Service unit 50 also includes a digital signal processing unit ("digital signal processor") 72, a central processing unit (CPU) 74 for processing data and otherwise performing logic and computing operations, and a memory unit 76 for storing data, such as RFID tag information or data to be transmitted over the WLAN. In an example embodiment, the different frequencies associated with the different signal channels are created by M/D unit 70 generating different RF carrier frequencies based on instructions from CPU 74. Also, as described below, the common frequencies associated with a particular combined picocell are created by M/D unit 70 generating the same RF carrier frequency.

Figure 3:
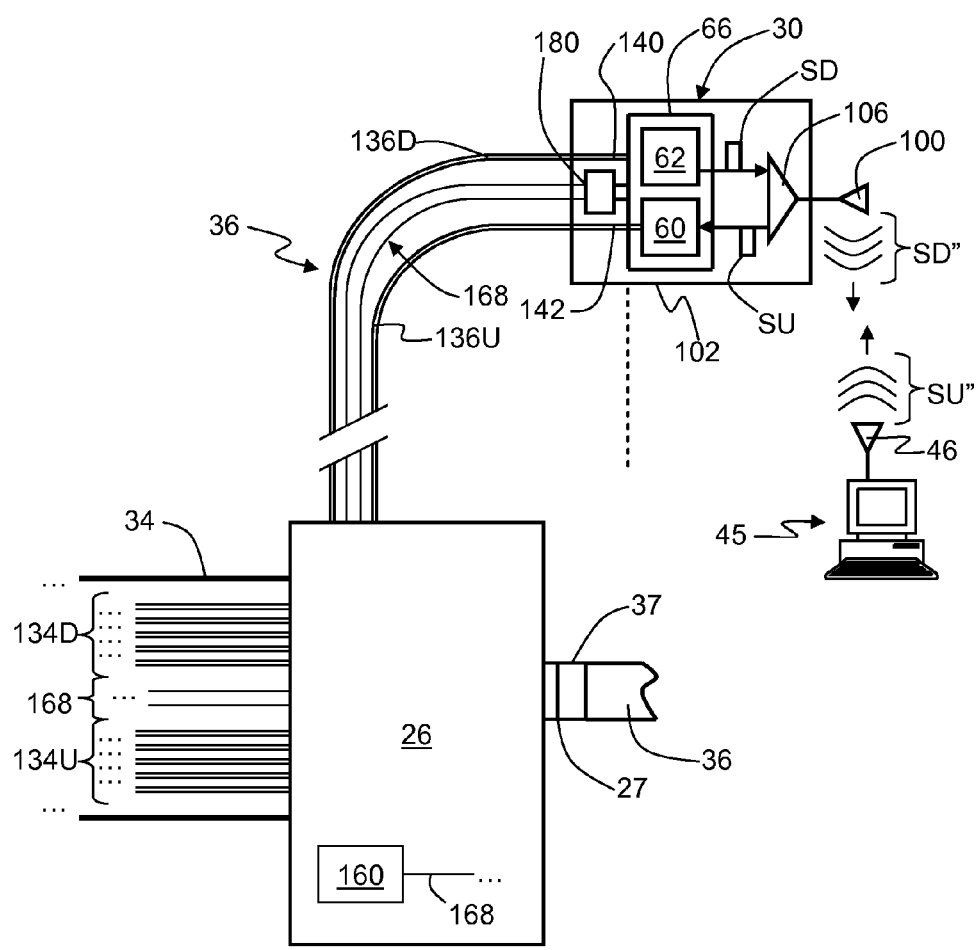
FIG. 3 is a detailed schematic diagram of an example embodiment of the distribution unit and transponder of the system of FIG. 1.

FIG. 3 is a detailed schematic diagram of an example embodiment of the portion of system 10 of FIG. 1 that includes distribution unit 26 and transponder 30. Transponder 30 includes a converter pair 66, wherein the E/O converter 60 and the O/E converter 62 therein are electrically coupled to an antenna system 100 via an RF signal-directing element 106, such as a circulator. Signal-directing element 106 serves to direct the downlink and uplink electrical RF service signals, as discussed below. In an example embodiment, antenna system 100 includes one or more directional patch antennas, such as disclosed in U.S. patent application Ser. No. 11/504, 999 filed Aug. 16, 2006, which patent application is incorporated herein by reference. In another example embodiment, antenna system has enhanced directionality, such as disclosed in U.S. patent application Ser. No. 11/703,016 filed Feb. 6, 2007, which patent application is incorporated by reference herein. Antenna system 100 is discussed in greater detail below. Transponder 30 also includes a housing 102 that in an example embodiment houses some or all of the various transponder elements. In an example embodiment, some or all of antenna system 100 lies outside of housing 102. In an example embodiment, housing 102 houses only the elements making up converter pair unit 66.

Figure 4:
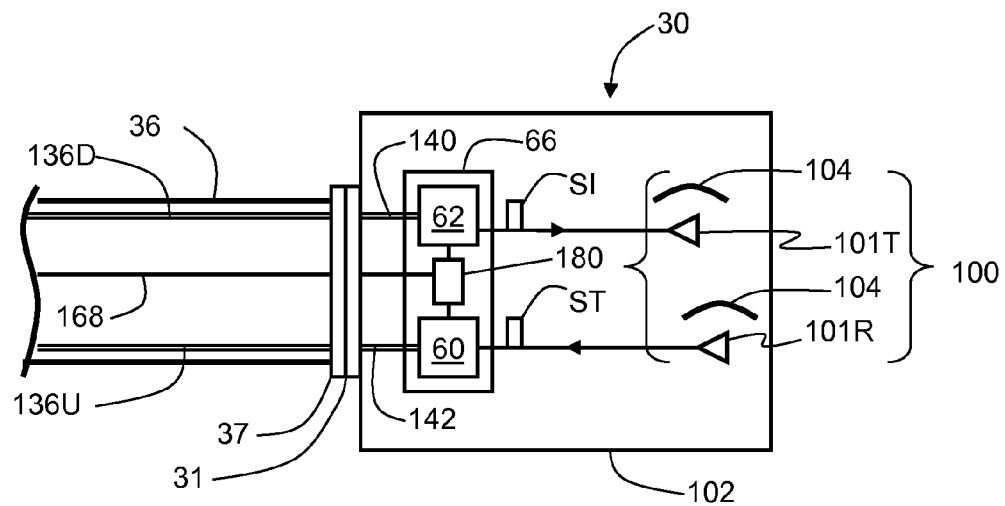
FIG. 4 is a close-up view of an alternative example embodiment for the transponder shown in FIG. 3 that includes a transmitting antenna element and a receiving antenna element within the transponder housing along with reflectors that enhance the directivity of the antenna elements.

FIG. 4 is a close-up view of an alternative example embodiment for transponder 30 wherein antenna system 100 includes two antennae: a transmitting antenna 101T electrically coupled to O/E converter 62, and a receiving antenna 101R electrically coupled to E/O converter 60. The two-antenna embodiment obviates the need for RF signal-directing element 106. Note also that the example embodiment of transponder 30 in FIG. 3 includes DC power converter 180 within converter pair unit 66, and that antenna system 100 is within housing 102. FIG. 4 also illustrates an example embodiment wherein transponder 30 includes a connector 31 adapted to connect to a corresponding connector plug 37 on tail cable 36. FIG. 4 also illustrates an example embodiment that includes at least one antenna reflector 104 arranged relative to antenna system 100 so as to enhance the directionality of the antenna system, such as described in aforementioned U.S. patent application Ser. No. 11/703,016.

Transponders 30 of the present invention differ from the typical access point device associated with non-RoF wireless communication systems in that the preferred embodiment of the transponder has just a few signal-conditioning elements and no digital information processing capability. Rather, the information processing capability is located remotely in head-end unit 20, and in a particular example, in service unit 50. This allows transponder 30 to be very compact and virtually maintenance free. In addition, the preferred example embodiment of transponder 30 consumes very little power, is transparent to RF signals, and does not require a local power source, as described below.

With reference to FIG. 2 and FIG. 3, in an example embodiment, optical fiber RF communication link 34 and tail cable 36 includes at least one downlink optical fiber 136D and at least one uplink optical fiber 136U. Downlink and uplink optical fibers 136D and 136U in optical fiber RF communication link 34 optically couple converter pair 66 at head-end unit 20 to distribution unit 26, while the downlink and uplink optical fibers in tail cable 36 connect the distribution unit 26 to the converter pair at transponder 30. Thus, each transponder 30 is optically coupled to head-end unit 20.

In an example embodiment, the optical-fiber-based wireless picocellular system 10 of the present invention employs a known telecommunications wavelength, such as 850 nm, 1300 nm, or 1550 nm. In another example embodiment, system 10 employs other less common but suitable wavelengths such as 980 nm.

Example embodiments of system 10 include either single-mode optical fiber or multimode optical fiber for downlink and uplink optical fibers 136D and 136U. The particular type of optical fiber depends on the application of system 10. For many in-building deployment applications, maximum transmission distances typically do not exceed 300 meters. The maximum length for the intended RoF transmission needs to be taken into account when considering using multi-mode optical fibers for downlink and uplink optical fibers 136D and 136U. For example, it has been shown that a 1400 MHz·km multi-mode fiber bandwidth-distance product is sufficient for 5.2 GHz transmission up to 300 m.

In an example embodiment, the present invention employs 50 μm multi-mode optical fiber for the downlink and uplink optical fibers 136D and 136U, and E/O converters 60 that operate at 850 nm using commercially available VCSELs specified for 10 Gb/s data transmission. In a more specific example embodiment, OM3 50 μm multi-mode optical fiber is used for the downlink and uplink optical fibers 136D and 136U.

Wireless system 10 also includes a power supply 160 that generates an electrical power signal 162. Power supply 160 is electrically coupled to head-end unit 20 for powering the power-consuming elements therein. In an example embodiment, an electrical power line 168 runs through the head-end unit and through distribution unit 26 to each transponder 30 to power E/O converter 60 and O/E converter 62 in converter pair 66, the optional RF signal-directing element 106 (unless element 106 is a passive device such as a circulator), and any other power-consuming elements (not shown). Alternatively, electrical power line 168 runs from distribution unit 26 that also optionally includes a power supply 160 (FIG. 3). In an example embodiment, electrical power line 168 includes two wires 170 and 172 that carry a single voltage and that are electrically coupled to a DC power converter 180 at transponder 30. DC power converter 180 is electrically coupled to E/O converter 60 and O/E converter 62, and changes the voltage or levels of electrical power signal 162 to the power level(s) required by the power-consuming components in transponder 30. In an example embodiment, DC power converter 180 is either a DC/DC power converter, or an AC/DC power converter, depending on the type of power signal 162 carried by electrical power line 168. In an example embodiment, electrical power line 168 includes standard electrical-power-carrying electrical wire(s), such as a twisted copper pair (e.g., 18-26 AWG (American Wire Gauge)) used in standard telecommunications and other applications. In another example embodiment, electrical power line 168 (dashed line) runs directly from power supply 160 to transponder 30 rather than from or through head-end unit 20. In another example embodiment, electrical power line 168 includes more than two wires and carries multiple voltages.

In an example embodiment, head-end unit 20 is operably coupled to an outside network 52 via a network link 53 (FIG. 2).

Multi-Port Accumulator

As mentioned above, a RoF wireless picocellular system that employs a linear array of transponders has some shortcomings relating to its manufacture and deployment. Accordingly, an aspect of the present invention addresses these and other shortcomings by consolidating transponders 30 into a more compact and more easily manufacturable and deployable RoF wireless picocellular system.

Figure 5:
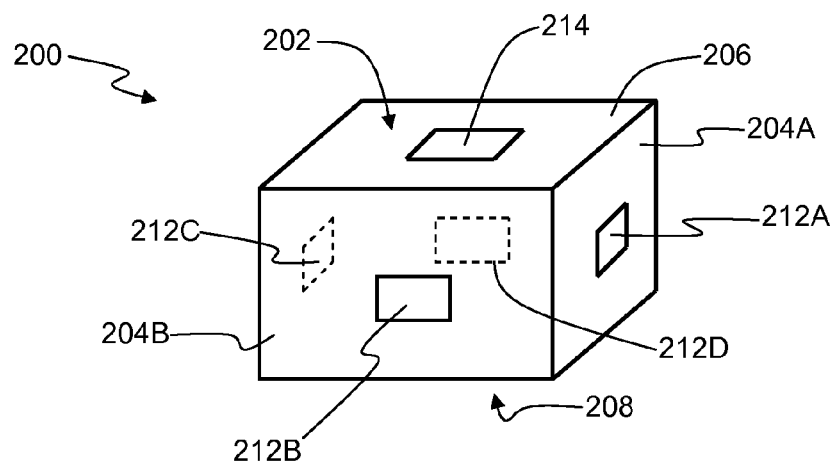
FIG. 5 is a schematic perspective diagram of an example embodiment of a multi-port accumulator according to the present invention that has four transponder ports.

FIG. 5 is a schematic perspective diagram of an example embodiment of a multi-port accumulator apparatus 200 ("multi-port accumulator") according to the present invention. Multi-port accumulator 200 includes a housing 202 having a number of sidewalls 204, a top wall 206 and a bottom wall 208. Housing 202 includes two or more transponder connector ports 212 formed in corresponding two or more of sidewalls 204. Multi-port accumulator 200 of FIG. 5 illustrates an example embodiment of a rectangular (square) housing 202 having four sidewalls 204A, 204B, 204C and 204D with four associated RoF transponder connector ports ("transponder ports") 212A, 212B, 212C and 212D. Housing 202 also includes a tail cable port 214 on top wall 206. Housing 202 can generally be made of a number of suitable materials, such as metal or plastic.

Figure 6:
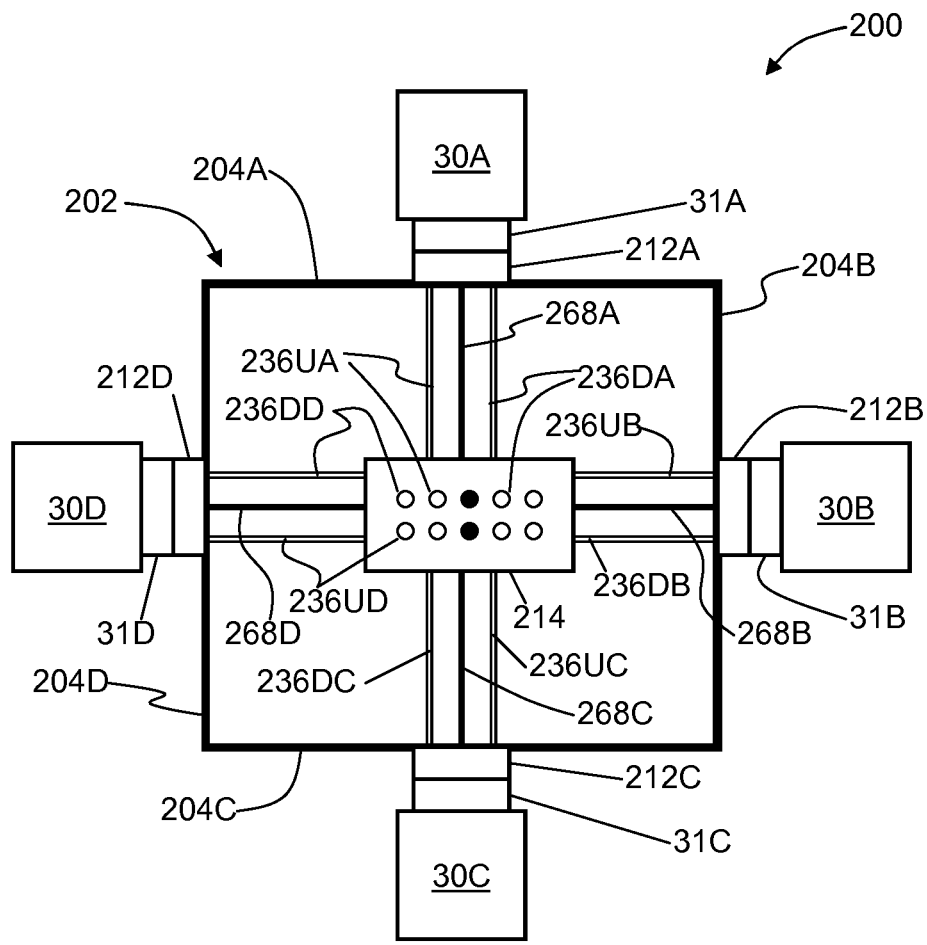
FIG. 6 is a plan view of an example embodiment of the multi-port accumulator of FIG. 5 with the top wall removed, showing the internal uplink and downlink optical fiber sections and the electrical power line sections that connect the tail cable port to the transponder ports.

FIG. 6 is a plan view of multi-port accumulator 200 with top wall 206 removed, showing tail cable connector port ("tail cable port") 214 and four transponders 30A, 30B, 30C and 30D operably coupled to the device via associated transponder ports 212A, 212B, 212C and 212D. Device 200 includes, for each transponder port 212, optical fiber sections 236U and 236D that correspond to uplink and downlink optical fibers 136U and 136D in tail cable 36. Thus, each optical fiber section 236UA and 236DA is optically connected at one end to transponder port 212A and at its opposite end to tail cable port 214, etc.

Likewise, device 200 includes for each transponder port 212 an electrical power line section 268 connected at one end to the transponder port and at its opposite end to tail cable port 214. Thus, electrical power line section 268A electrically connects transponder port 212A to tail cable port 214, etc.

Figure 7:
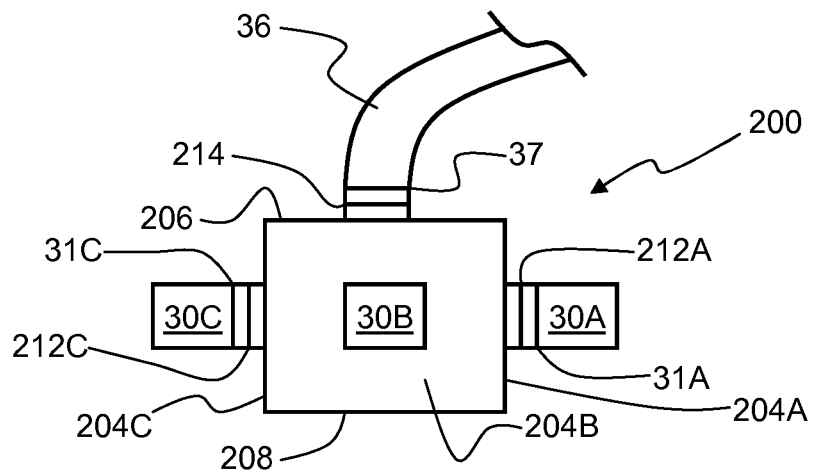
FIG. 7 is a side view of the multi-port accumulator of FIG. 6 showing the tail cable connected to tail cable port.
Figure 8:
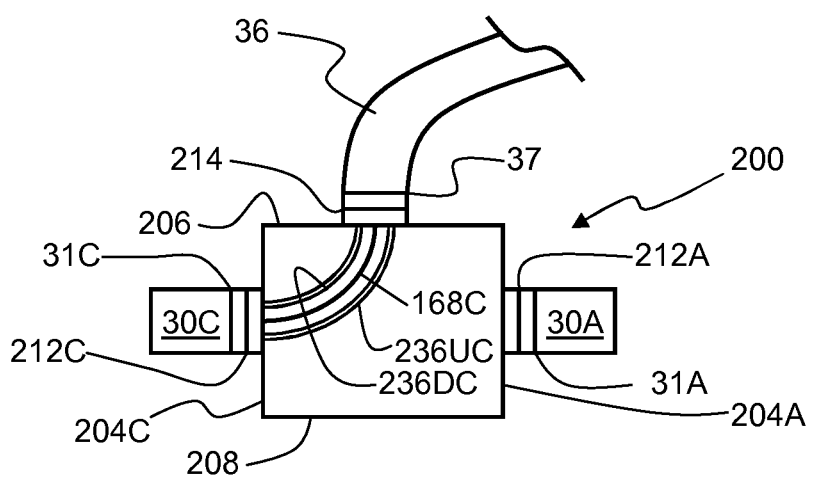
FIG. 8 is the same as FIG. 7, but with the sidewall removed to illustrate the optical and electrical connections between the tail cable port and one of the transponder ports.

FIG. 7 is a side view of the multi-port accumulator 200 of FIG. 6. showing the connection of tail cable 36 to the multi-port accumulator using tail cable connector plug 37 connected to tail cable port 214. FIG. 8 is a side view of device 200 as shown in FIG. 7 with sidewall 204B removed, illustrating the optical and electrical connections between tail cable port 214 and transponder port 212C via optical fiber sections 236UC, 236DC and electrical power line section 168C. The other transponder ports 212A, 212B and 212C are similarly connected to tail cable port 214.

Figure 9:
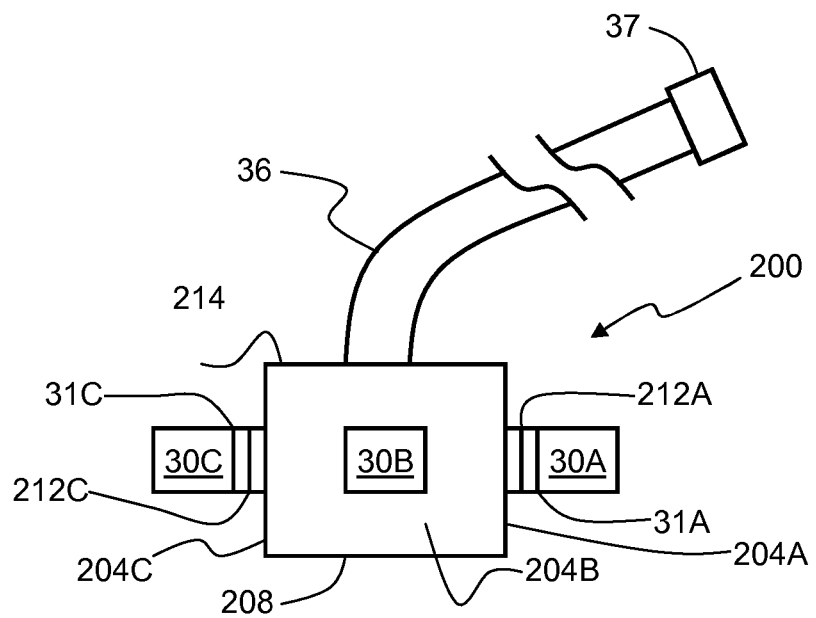
FIG. 9 and FIG. 10 are the same as FIG. 7 and FIG. 8, respectively, and illustrate an example embodiment of a pre-stubbed configuration of the multi-port accumulator and tail cable.
Figure 10:
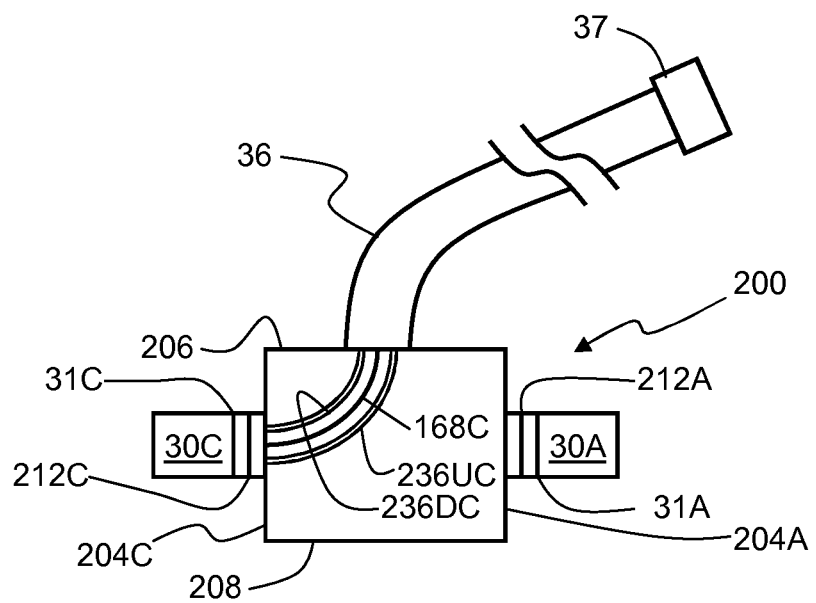

FIG. 9 and FIG. 10 are similar to FIG. 7 and FIG. 8, respectively, and illustrate an example embodiment of multi-port accumulator 200 and tail cable 36 in a pre-stubbed configuration that does not require tail cable port 214. In the pre-stubbed configuration embodiment, rather than using separate optical fiber sections 236U and 236D to connect to each RF transponder port 212, uplink and downlink optical fibers 136U and 136D are stripped out of the tail cable and connected directly to associated RF transponder ports.

In an example embodiment, tail cable 36 includes a connector plug 37 at the end opposite multi-port accumulator 200 for connecting to distribution unit 26 at a mating connector socket 27 (FIG. 3). Similarly, further embodiments of the present invention comprise tail cables, similar to tail cable 36, that include a connector plug, similar to the connector plug 37, rather than cable ports, such as cable ports 212A-212D, to connect the transponders, such as transponders 30. Even further embodiments of the present invention include multi-port accumulators with permanently mounted cable assemblies to which transponders are permanently connected.

General Method of Operation Using Multi-Port Accumulator

Figure 11:
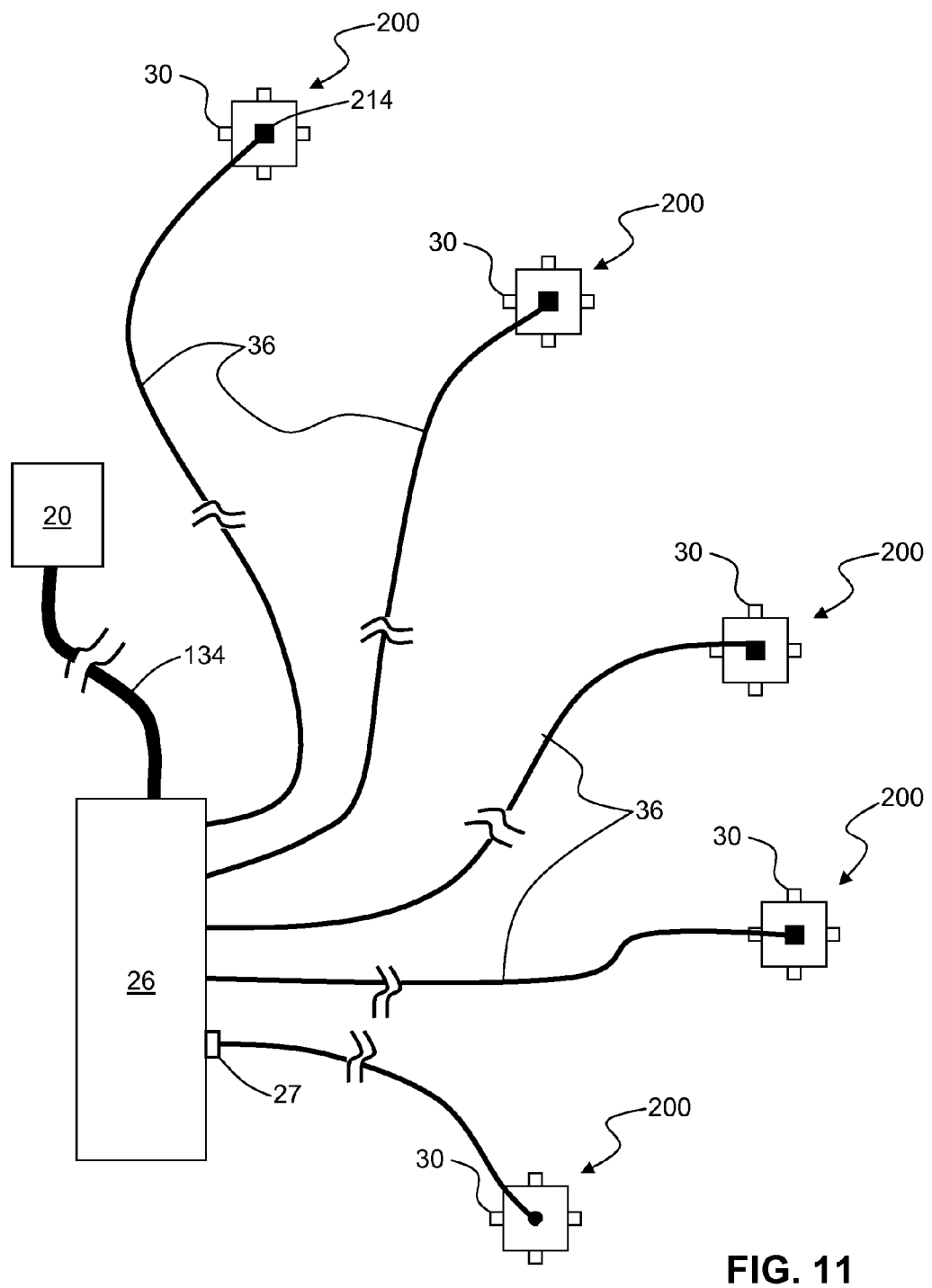
FIG. 11 is a schematic diagram of an example embodiment of an RoF wireless picocellular system according to the present invention similar to that shown in FIG. 1 but that utilizes a number of multi-port accumulators.

FIG. 11 is a schematic diagram of an example embodiment of an RoF wireless picocellular system 10 similar to that shown in FIG. 1 but that utilizes one or more multi-port accumulators 200 according to the present invention to deploy transponders 30. Note that the lower-most multi-port accumulator in FIG. 11 is in the aforementioned pre-stubbed configuration discussed in connection with FIG. 9 and FIG. 10.

With reference to FIG. 11 as well as to FIG. 2, in the operation of system 10 service unit 50 in head-end unit 20 generates an electrical downlink RF service signal SD ("electrical signal SD") corresponding to its particular application. In an example embodiment, this is accomplished by digital signal processor 72 providing RF M/D unit 70 with an electrical signal (not shown) that is modulated onto an RF carrier to generate a desired electrical signal SD.

Electrical signal SD is received by E/O converter 60, which converts this electrical signal into a corresponding optical downlink RF signal SD' ("optical signal SD'"), which is then directed to a number (e.g., five) of downlink optical fibers 134D of primary optical fiber RF communication link 34. It is noted here that in an example embodiment optical signal SD' is tailored to have a given modulation index. Further, in an example embodiment the modulation power of E/O converter 60 is controlled (e.g., by one or more gain-control amplifiers, not shown) to vary the transmission power from antenna system 100. In an example embodiment, the amount of power provided to antenna system 100 is varied to define the size of picocell coverage area 44 of the associated picocell 40.

Optical signal SD' travels over downlink optical fibers 134D to distribution unit 26, which serves to direct signals SD' to the downlink optical fibers 136D of the five tail cables 36. Optical signal SD' then travels over the respective tail cables 36 to the associated multi-port accumulator 200. Optical signals SD' in each downlink optical fiber 136D are then directed to the associated downlink optical fiber section 236D via tail cable port 214 and thus to the associated transponder connector port 212. Each optical signal SD' is then received by O/E converter 62 in the associated transponder 30. Each O/E converter 62 converts optical signal SD' back into electrical signal SD, which then travels to signal-directing element 106. Signal-directing element 106 then directs electrical signal SD to antenna system 100. Electrical signal SD is fed to antenna system 100, causing it to radiate a corresponding electromagnetic downlink RF signal SD" ("electromagnetic signal SD'''") to create an associated picocellular coverage area.

Figure 12:
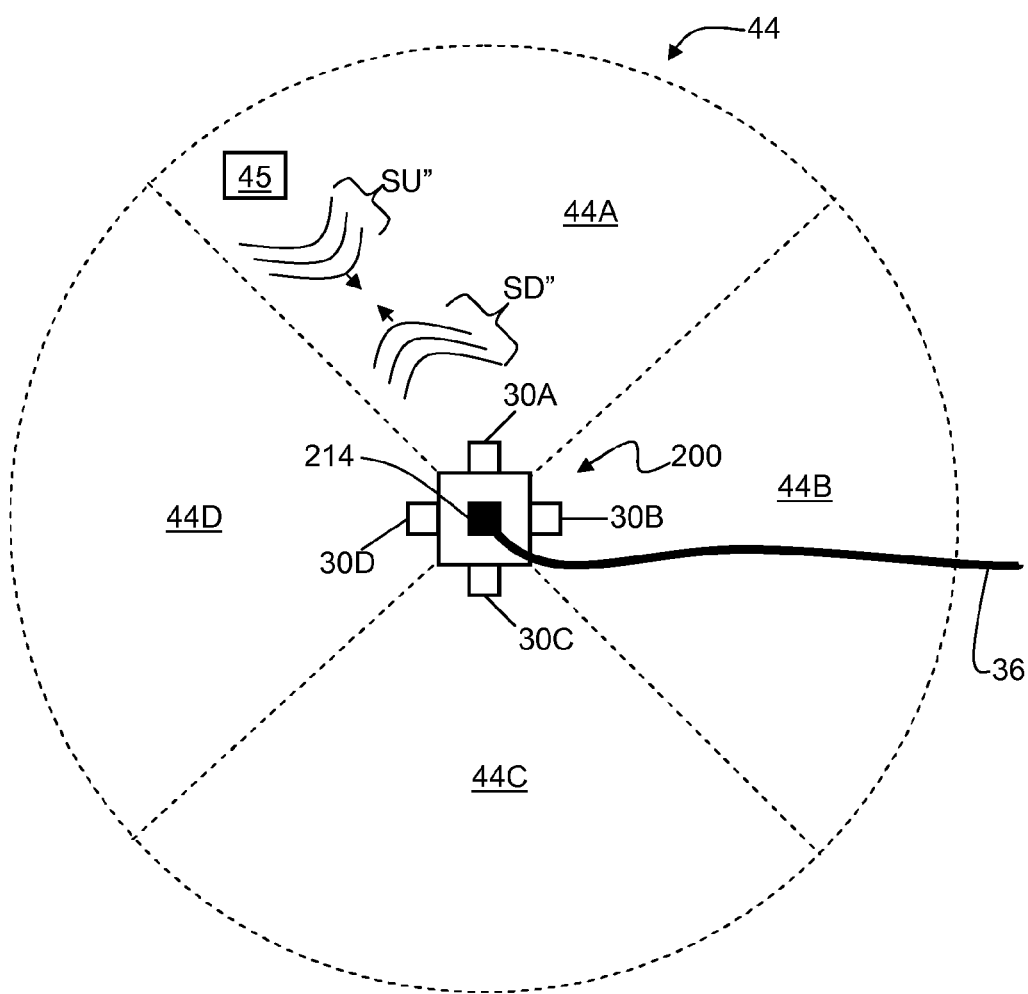
FIG. 12 is a close-up plan view of one of the multi-port accumulators of FIG. 11, showing the associated picocellular coverage area as made up of four picocellular coverage sub-areas associated with the four transponders supported by the multi-port accumulator.

FIG. 12 is a close-up plan view of one of the multi-port accumulators 200 of FIG. 11, showing the picocellular coverage area 44 associated with the multi-port accumulator. Because antenna system 100 of each transponder 30 supported by multi-port accumulator 200 is directional, picocellular coverage area 44 is made up of two or more sub-areas 44A, 44B, . . . etc.—such as sub-areas 44A, 44B, 44C and 44D as shown in FIG. 12. If a client device 45 is within one of the picocellular coverage sub-areas (e.g., sub-area 44A as shown in FIG. 12), the client device will receive electromagnetic signal SD" via client device antenna 46 (FIG. 1), which may be part of a wireless card, or a cell phone antenna, for example. Antenna 46 converts electromagnetic signal SD" into electrical signal SD in the client device (signal SD is not shown therein). Client device 45 then processes electrical signal SD, e.g., stores the signal information in memory, displays the information as an e-mail or text message, etc.

In an example embodiment, client device 45 generates an electrical uplink RF signal SU (not shown in the client device), which is converted into an electromagnetic uplink RF signal SU" ("electromagnetic signal SU'''") by antenna 46.

Because client device 45 is located within picocellular coverage sub-area 44A, electromagnetic signal SU" is detected by antenna system 100 of the transponder 30A. Antenna system 100 converts electromagnetic signal SU" back into electrical signal SU. Electrical signal SU is directed by signal-directing element 106 to E/O converter 60, which converts this electrical signal into a corresponding optical uplink RF signal SU' ("optical signal SU'''"), which is then directed into uplink optical fiber section 236U at transponder port 212A. Optical signal SU' travels over optical fiber section 236U to tail cable port 214, which serves to direct this optical signal onto the associated uplink optical fiber 136U of the associated tail cable 36 connected to the tail cable port.

Optical signal SU' travels over uplink optical fiber 136U to distribution unit 26, where it is directed to the associated uplink optical fiber 134U of primary RF optical fiber communication link 134. Optical signal SU' then travels over primary RF optical fiber communication link 134 to head-end unit 20, where it is received by O/E converter 62. O/E converter 62 converts optical signal SU' back into electrical signal SU, which is then directed to service unit 50. Service unit 50 receives and processes signal SU, which in an example embodiment includes one or more of the following: storing the signal information; digitally processing or conditioning the signal; sending the signal on to one or more outside networks 52 via network links 224; and sending the signal to one or more client devices 45 in one or more of the other picocellular coverage areas 44 or sub-areas 44A, 44B, etc. In an example embodiment, the processing of signal SU includes demodulating this electrical signal in RF signal M/D unit 70, and then processing the demodulated signal in digital signal processor 72.

Transponder with Adjustable Antenna System Directivity

Figure 13:
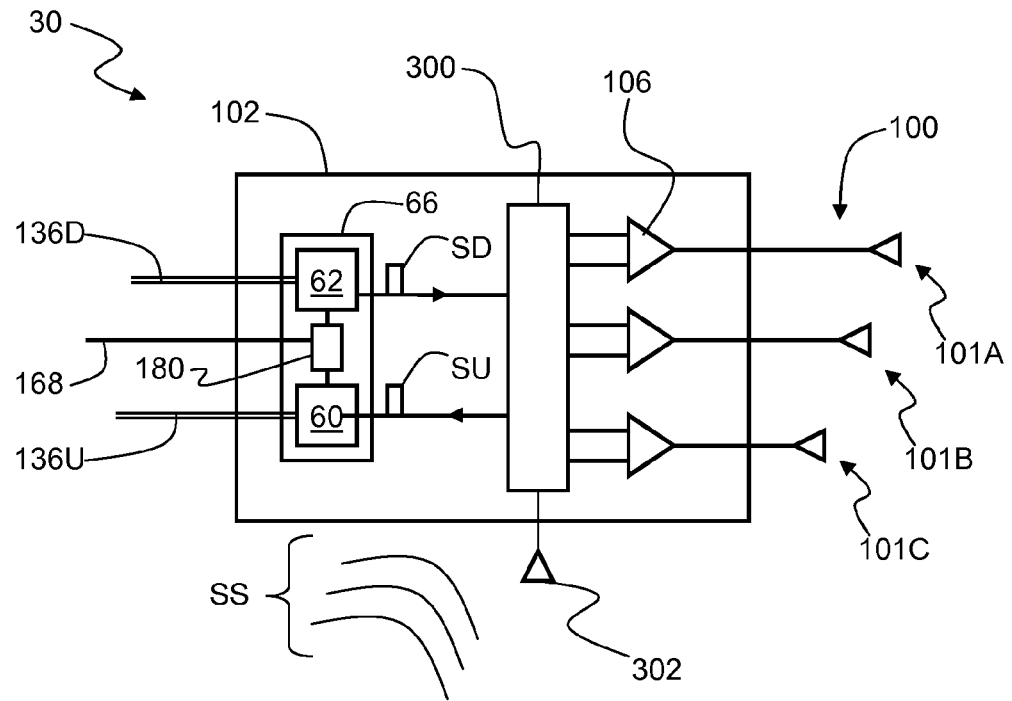
FIG. 13 is an example embodiment of a transponder for use with the multi-port accumulator and that includes an antenna system with adjustable antenna directionality.

FIG. 13 is an example embodiment of transponder 30 that includes an antenna system 100 that has adjustable directivity. Transponder 30 of FIG. 13 includes two or more antenna elements 101 such as the three antenna elements 101A, 101B and 101C shown, each having a different directivity (i.e., EM radiation pattern). Antenna elements 101 are electrically connected to an antenna switch 300 that switches among the antenna element(s) 101 of antenna system 100 to be used.

In an example embodiment, antenna element 101A is configured to provide coverage for all or substantially all of picocell coverage area 44, antenna element 101B is configured to cover two picocell coverage sub-areas (i.e., sub-areas 44A and 44B), while antenna element 101C is configured to cover picocell coverage sub-area 44A. This allows for multi-port accumulator 200 to form some or all of picocell coverage area 44 using one, some or all of transponders 30 of multi-port accumulator 200. In an example embodiment, antenna switch 300 includes an antenna 302 and is configured to be switchable via a wireless switching signal SS received by antenna 302. In another example embodiment, switching signal SS is non-wireless and originates from head-end unit 20 or from distribution unit 26.

Other Multi-Port Accumulator Housing Geometries

Figure 14:
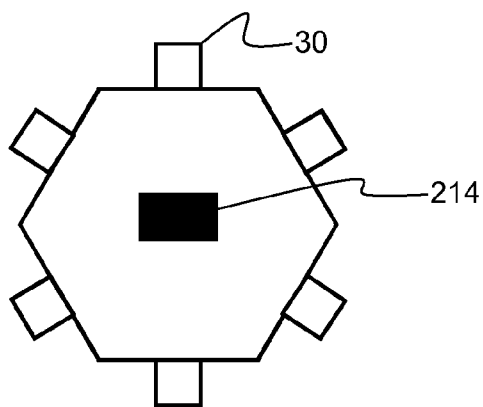
FIG. 14 is a schematic plan view of an example embodiment of a multi-port accumulator having a hexagonal-shaped housing that supports six transponders.
Figure 15:
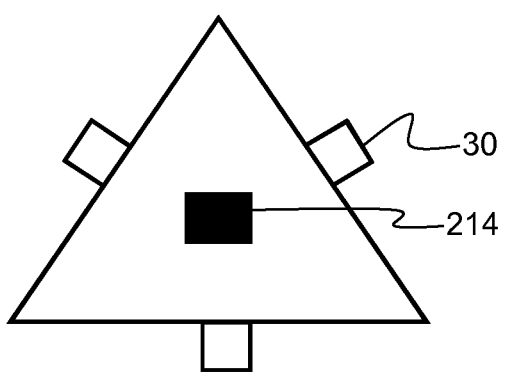
FIG. 15 is a schematic plan view of an example embodiment of a multi-port accumulator having a triangular-shaped housing that supports three transponders.

For the sake of illustration, multi-port accumulator 200 is described above in connection with a rectangular-shaped housing 202 that supports four transponders 30. FIG. 14 is a schematic plan view of an example embodiment of a multi-port accumulator 200 having a hexagonal-shaped that operably supports six transponders 30. Likewise, FIG. 15 is a schematic plan view of an example embodiment of a multi-port accumulator 200 having a triangular-shaped housing that operably supports three transponders 30. Further embodiments of the present invention include alternative accumulators comprising any number of transponders in any geometric arrangement.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A radio over fiber (RoF) wireless picocellular system, comprising:
 a head-end unit configured to be operably connected to an outside network and receive downlink signals from the outside network;
 a plurality of tail cables, each of the tail cables comprising a plurality of optical fibers;
 a distribution unit optically coupled to the head-end unit via a primary optical fiber RF communications link, the distribution unit configured to divide the primary optical fiber RF communication link into the plurality of tail cables and direct the downlink signals onto the tail cables;
 a plurality of multi-port accumulators, each of the plurality of multi-port accumulators receiving a respective tail cable among the plurality of tail cables, and each of the plurality of multi-port accumulators comprising at least two transponders, each transponder configured to direct uplink and downlink signals,
 wherein each of the at least two transponders is coupled to the primary optical fiber RF communication link via at least two of the plurality of optical fibers in the respective tail cable, and each of the at least two transponders and is configured to form a picocell coverage area and to wirelessly communicate with a client device within the picocell coverage area using the uplink and downlink signals; and wherein each multi-port accumulator among the plurality of multi-port accumulators further comprises:

a housing including a plurality of sidewalls, at least a portion of the plurality of sidewalls includes a plurality of transponder connector ports, and a tail cable port configured to be optically and electrically coupled to one of the plurality of tail cables, such that individual optical fibers of the plurality of optical fibers in each tail cable are coupled from the tail cable port to respective transponder connector ports; and wherein the at least two transponders for each multi-port accumulator among the plurality of multi-port accumulators are each optically and electrically connected to one of the plurality of transponder connector ports for the respective multi-port accumulator.

2. The system of claim 1, wherein the head-end unit comprises:

a service unit electrically coupled to an electrical-to-optical converter; and the electrical-to-optical converter configured to receive downlink electrical RF service signals from the service unit and to convert the downlink electrical RF service signals to corresponding downlink optical RF service signals carried on the primary optical fiber RF communication link.

3. The system of claim 2, wherein the head-end unit further comprises a RF signal modulator/demodulator unit configured to generate a RF carrier signal of a given frequency and to modulate the downlink electrical RF service signals onto the RF carrier signal.

4. The system of claim 3, wherein the head-end unit further comprises a central processing unit (CPU) system, the CPU system configured to instruct the RF signal modulator/demodulator unit to create RF carrier signals at different frequencies for the RE service signals to be modulated onto the RF carrier signal.

5. The system of claim 2, wherein the distribution unit is configured to receive the downlink optical RF service signals from the head-end unit, and direct the downlink optical RF service signals to at least one of the plurality of multi-port accumulators.

6. The system of claim 1, wherein the head-end unit comprises:

a service unit electrically coupled to an optical-to-electrical converter; and the optical-to-electrical converter configured to receive uplink optical RF service signals from the plurality of multi-port accumulators and to convert the uplink optical RF service signals to corresponding uplink electrical RF service signals provided to the service unit.

7. The system of claim 6, wherein the distribution unit is configured to receive the uplink optical RF service signals from at least one of the plurality of multi-port accumulators over at least one tail cable among the plurality of tail cables, and direct the uplink optical RF service signal to the head-end unit over the primary optical fiber RF communications link.

8. The system of claim 1, wherein the distribution unit comprises a plurality of mating connector sockets, wherein each of the plurality of the tail cables includes a connector plug removably connected to one of the plurality of mating connector sockets.

9. The system of claim 1, wherein the head-end unit is configured to receive power from a power unit, and each of the plurality of multi-port accumulators is configured to receive at least a portion of the power from the head-end unit to provide the at least portion of the power to the at least two transponders.

10. The system of claim 1, wherein the primary optical fiber RF communications link comprises at least one uplink optical fiber; at least one downlink optical fiber; and at least one electric power line.

11. The system of claim 1, wherein each of the plurality of tail cables is optically and electrically coupled to at least one of the plurality of multi-port accumulators.

12. The system of claim 1, wherein each of the plurality of multi-port accumulators is optically and electrically coupled in parallel to the distribution unit via the plurality of tail cables.

13. The system of claim 1, wherein each of the at least two transponders comprises:

an antenna system configured to wirelessly communicate with the client device; and a converter pair unit configured to convert optical information from the head-end unit to electrical information for the antenna system.

14. The system of claim 1, wherein each of the at least two transponders is free from digital information processing capability.

15. The system of claim 1, wherein each of the at least two transponders is removably connected to one of the plurality of transponder connector ports with a connector.

16. The system of claim 1, wherein the each of the multi-port accumulators further comprises respective two or more internal electrical power line sections disposed within the housing, wherein the respective two or more internal electrical power line sections electrically couple the tail cable port to the plurality of transponder connector ports.

17. A method of establishing a wireless connection between a network and a client device, comprising:

operably connecting a head-end unit to an outside network;

optically coupling a distribution unit to the head-end unit via a primary optical fiber RF communications link, the distribution unit dividing a primary optical fiber RF communication link into a plurality of tail cables, each of the plurality of tail cables comprising a plurality of individual optical fibers;

receiving a respective tail cable of the plurality of tail cables at one of the plurality of multi-port accumulators, each of the plurality of multi-port accumulators including at least two transponders, each transponder configured to direct uplink and downlink signals;

coupling each of the at least two transponders to the primary optical fiber RF communications link through individual optical fibers in the respective tail cable;

forming a picocell coverage area with each of the at least two transponders to wirelessly communicating with a client device within the picocell coverage area;

optically and electrically coupling the at least two transponders of each multi-port accumulator among the plurality of multi-port accumulators to corresponding ones of a plurality of transponder connector ports for the respective multi-port accumulator;

optically and electrically coupling one of the plurality of tail cables to a tail cable port of each multi-port accumulator among the plurality of multi-port accumulators; and wherein the each of the plurality of multi-port accumulators comprises a housing including a plurality of sidewalls at least a portion of the plurality of sidewalls includes the plurality of transponder connector ports and the tail cable port.

18. The method of claim 17, further comprising:
electrically coupling a service unit of the head-end unit to an electrical-to-optical converter of the head-end unit; and
receiving downlink electrical RF service signals with the electrical-to-optical converter from the service unit; and converting the downlink electrical RF service signals to corresponding downlink optical RF optical signals to be carried on the primary optical fiber RF communications link.

19. The method of claim 17, further comprising:
electrically coupling a service unit of the head-end unit to an optical-to-electrical converter of the head-end unit; and
receiving uplink optical RF service signals with the optical-to-electrical converter from the primary optical fiber RF communications link; and converting the uplink optical RF service signals to corresponding uplink electrical RF optical signals for the service unit.

20. The method of claim 17, further comprising removably connecting a connector plug of each of the plurality of tail cables into a corresponding one of a plurality of mating connector sockets of the distribution unit.

\* \* \* \* \*